April 14, 1964     H. T. SCOTT     3,128,804
INSERTED-TOOTH SAW BIT
Filed July 9, 1962

INVENTOR
HARTWELL T. SCOTT
BY *Fisher, Christen, Sabol & Caldwell*
ATTORNEYS

United States Patent Office 3,128,804
Patented Apr. 14, 1964

3,128,804
INSERTED-TOOTH SAW BIT
Hartwell T. Scott, Rte. 2, Homerville, Ga.
Filed July 9, 1962, Ser. No. 208,353
5 Claims. (Cl. 143—141)

This invention relates to wood-working equipment, and more particularly to a novel type of removable saw tooth bit.

While not limited in this respect, the present invention has particular utility with heavy-duty circular saws of the type used in lumber yards for sawing logs into planks and boards.

It has been found in practice that a saw having teeth formed in accordance with conventional practice has a tendency, particularly when making the first cut along the side of a log, to become distorted. This is due to the interaction of forces developed resulting from the fact that the teeth of the saw enter the log in an angular direction with respect to the surface thereof. Consequently, there is a tendency for the saw to buckle or bend with the result that the saw will not make a straight cut and an excessive amount of wood must be planed off later to provide finished planks or boards having standard dimensions.

Not only is wood lost due to the irregularity of the cut, but in addition, the saw when so distorted or buckled, will also make an excessively wide cut which increases the waste.

One purpose of the present invention, therefore, is to provide an inserted-tooth saw bit which will run true regardless of the direction in which it enters the wood.

Another object of the invention is to provide a saw bit having means to guide or stabilize it during passage through the material being sawed so that any tendency towards lateral displacement will be counteracted.

As an indication of the effectiveness of saw teeth made in accordance with this invention, it has been found by experiment that a saving of amounting to as much as a quarter of an inch in width can be achieved on each cut of an average length log; and, in the case of a 12 inch diameter log, this saving results in the fact that five two-inch thick planks may be cut instead of the four cut by a conventional saw.

Other objects and advantages will be apparent to those skilled in the art after reading the following specification in connection with the annexed drawing, in which.

Figure 2:
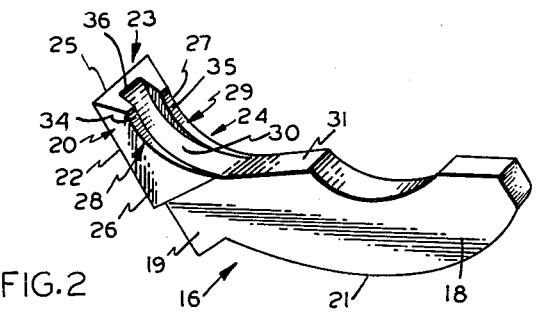
FIG. 2 is a perspective view of an inserted-tooth saw bit made in accordance with this invention.
Figure 1:
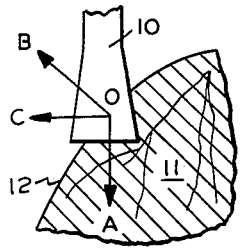
FIG. 1 is a diagrammatic representation of the forces acting on a saw when cutting material in an angular direction to the surface of the material.

Referring now to the drawings in detail, there is shown in FIG. 1 a diagram of the forces generated when a saw tooth, indicated by the numeral 10, initially penetrates material such as a log, indicated by the numeral 11, while moving in a downward direction during any cut other than one which occurs at the exact center of the log.

The condition illustrated is particularly aggravated when making the first cut in a log to remove the initial slab of wood due to the fact that the angle of inclination of the surface 12 of the log with respect to the direction of movement of the saw tooth is greatest during such a cut.

For purposes of illustration, the arrow O—A may represent the direction and extent of the downward force exerted by the tooth 10. The line O—B may represent the reactive force of the wood in a direction normal to the surface 12. Due to the angular relationship between the forces O—A and O—B, there will be developed a horizontal component of force, indicated by the line O—C, and it is this horizontal component which tends to bend a saw or deflect it sideways from a straight cut.

This horizontal component of force is developed as each tooth enters the log and therefore the successive forces are cumulative so that when a long cut is being made in a log, the extent of deviation of the end of the cut from that of its original course can be extremely serious.

Conventional saw teeth of the prior art are provided with a smooth transversely extending flat cutting face (not shown), which offers no resistance to the transverse reaction force O—C other than the comparatively minor amount developed by frictional engagement of the cutting face with the wood and, therefore, only the resistance to bending of the saw itself can prevent transverse displacement of each tooth as it comes into engagement with the log.

However, some bending will always occur with conventional teeth because a blade having the strength to resist transverse forces completely would be too thick to be of practical use.

Figure 8:
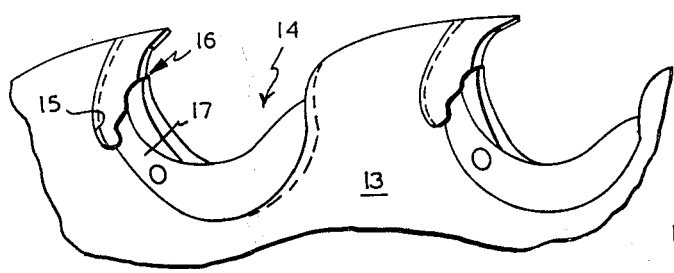
FIG. 8 is a side view of a portion of the periphery of a saw showing the saw bit inserted in position.

Turning now to the present invention, as shown in FIGS. 2 through 8, we see that in FIG. 8, there is shown a portion of the periphery of a circular saw 13, provided at regular intervals with indented sockets, indicated generally by the numeral 14; each of which sockets is formed with a seating recess 15 at its rearward portion adapted to removably receive a saw bit, indicated generally by the numeral 16, and having a forward portion 17 adapted to removably receive a conventional anchor shank (not shown).

The saw bit 16 manufactured in accordance with this invention is more clearly shown in FIGS. 2 through 7, and is formed with an elongated leg portion 18, supporting a head portion 19 provided with a forwardly projecting cutter tip 20. The back 21 of the leg portion is generally arcuate in the longitudinal direction and is undercut with the usual V-shaped cross-section to mate with the complementary portion of the seating recess 15 of the saw, while the radial face 22 of the head is substantially flat.

The cutting face, indicated generally by the numeral 23, and the arcuately disposed chip-receiving face, indicated generally by the numeral 24, intersect each other near the forward portion of the head, while the cutting face angularly intersects the radial face to form a chisel cutting edge 25, the general arrangement of these elements being similar to conventional saw bits.

The side faces 26 and 27, respectively, are disposed in planes which converge toward each other in a direction which, when viewed from the front of the bit, would lie in a plane intersecting the cutting edge 25 and extending medially of the planes of the radial face 22 and cutting face 23. Thus, the widest point of the bit is the cutting edge itself and the body of the cutter tip becomes progressively narrower both in a rearward direction, as may be observed in FIG. 4, and in a downward direction, as may be observed in FIG. 3.

The chip-receiving face 24 differs from normal construction in that it is provided with a pair of transversely spaced arcuate stabilizing ribs 28 and 29 which define between them a throat portion having a semi-cylindroidal bottom surface 30 which merges smoothly into the forward face 31 of the leg portion 18. The generatrix of the surface 30 is a straight line which in all positions along the surface lies normal to the plane in which movement of the saw tooth takes place during operation.

As a result, it should be noted that the intersection of the throat surface 30 with the cutting face 23 will, therefore, define a straight line 36 parallel with the cutting edge 25. While the semi-cylindroidal surface 30 could be a portion of a true cylinder, it is preferable that the directrixes for the generatrix of this surface be a pair of similar involute curves lying in spaced planes parallel to the plane of movement of the saw, the radius of curvature of the curves progressively increasing in the direction of movement of material through the throat.

Figure 3:
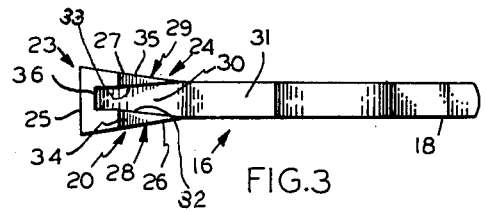
FIG. 3 is a front view of the same.
Figures 4, 5:
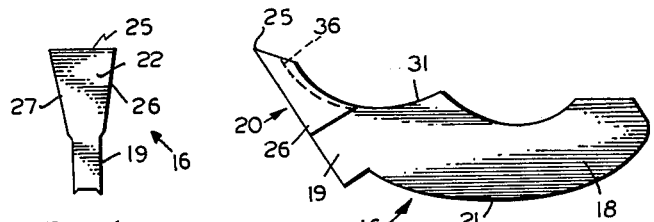
FIG. 4 is a view of the bit from the radial face of the cutter tip.
FIG. 5 is a side view.
Figure 6:
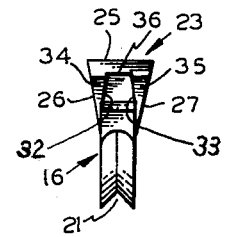
FIG. 6 is a view of the bit from the leg portion.
Figure 7:
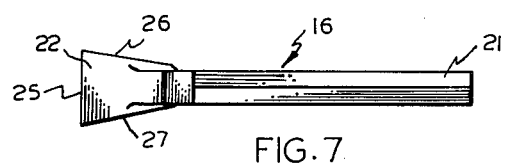
FIG. 7 is a view from the back.

The respective inner walls 32 and 33 of the stabilizing ribs which define the sides of the throat are disposed in flat planes lying generally normal to the surface of the throat 30, but longitudinally diverging away from each other when viewed in a direction looking towards the cutting edge 25 as seen in FIG. 3. The forward faces 34 and 35 of the stabilizing ribs are also formed with semi-cylindroidal surfaces having a common straight line generatrix which in all positions lies parallel with the generatrix of the surface 30, the two generatrices preferably, but not necessarily, merging at the place where the surface 30 merges with the forward face 31 of the leg portion.

In operation, it will be observed that when the improved saw bit 16 enters the material to be sawed at an angular inclination to the surface thereof (as was the case with the saw bit 10 shown diagrammatically in FIG. 1), the first portion of the cutting face 23 to enter the material will be one or the other of the stabilizing ribs 28 or 29. Of course, after the saw bit has fully entered the material, both of the stabilizing ribs will become embedded.

However, even during the initial entry of the bit into the material, any force tending to urge the saw in a transverse direction will be resisted by the presence of the rib which has first entered the material. Additionally, the fact that the forward faces of the ribs and the bottom surface of the throat portion 30 are semi-cylindrical or semi-cylindroidal surfaces whose generatrices lie normal to the plane of movement of the saw, ensures that no transverse component of force will be developed as these surfaces pass through the material being cut. Furthermore, since the throat-receiving portion merges smoothly with the forward face 31 also ensures that the chips of material being cut will have an unobstructed passage downwardly along the length of the bit so that they will be freely discharged when the bit leaves the material.

The passage of chips through the throat 30 is facilitated by the fact that the inner walls 32 and 33 of the stabilizing ribs are planar, and diverge away from each other in the direction of movement of the chips, so that the cross-sectional dimensions of the throat increase as the chips move through it.

Finally, whenever, through continued use of the saw bit, the cutting edges become dull, they may easily be shapened by simply grinding the cutting face 23 to recondition it as a plane surface, whereby all of the cutting edges will be restored.

Having disclosed a preferred embodiment of the invention, it will be understood that various modifications and improvements could be made by one skilled in the art which would come within the scope of the annexed claims.

I claim:

1. An inserted tooth saw bit having an elongated leg portion, head portion and cutter tip portion, said cutter tip portion having; a radial face, a pair of side faces, a cutter face, and a semi-cylindroidal chip-receiving face; said chip-receiving face being provided with a central longitudinally extending semi-cylindroidal throat portion defined between a pair of forwardly projecting stabilizing ribs, the respective inner faces of the ribs being defined by planes generally normal to the plane of the radial face and slightly diverging from each other in a direction extending longitudinally of the throat portion away from the cutting edge.

2. The invention as defined in claim 1, wherein the forward faces of the stabilizing ribs are also semi-cylindroidal surfaces which merge with the throat portion at the inner end of the throat portion.

3. The invention as defined in claim 1, wherein the outer faces of said stabilizing ribs are defined by the planes of the respective side faces of the cutter tip.

4. The invention as defined in claim 1, wherein the forward faces of the stabilizing ribs are also semi-cylindroidal surfaces which merge with the throat portion at the inner end of the throat portion, and the outer faces of said stabilizing ribs are defined by the planes of the respective side faces of the cutter tip.

5. An inserted-tooth saw bit comprising an elongated member having a leg portion and a forwardly projecting cutter tip portion, said cutter tip portion having a flat angularly forwardly directed cutting face providing a transversely cutting edge at its forward margin disposed normal to the direction of movement of the saw, said cutter tip portion having a generally arcuate forward face, the forward end of the forward face angularly intersecting the cutting face, said forward face having a longitudinally extending centrally recessed chip-receiving throat portion also intersecting the cutting face, the bottom surface of the throat portion being arcuate in a longitudinal direction but being developed by a straight line generatrix which in all positions lies normal to the direction of movement of the saw, the directrixes for said generatrix being similar involute curves lying in spaced planes parallel to the plane of movement of the saw, said throat portion having spaced planar side walls, the distance between said side walls progressively increasing in the direction of movement of material through the throat portion.

References Cited in the file of this patent

UNITED STATES PATENTS

| | | |
|---|---|---|
| 630,234 | Jewett | Aug. 1, 1899 |
| 2,360,336 | Gibbs | Oct. 17, 1944 |